United States Patent
Neuhaus et al.

(10) Patent No.: US 10,615,943 B2
(45) Date of Patent: Apr. 7, 2020

(54) DEVICE AND METHOD FOR SCHEDULING AN ALLOCATION OF A SET OF LINK RESOURCES

(71) Applicant: Intel IP Corporation, Santa Clara, CA (US)

(72) Inventors: Holger Neuhaus, Munich (DE); Xiaofeng Wu, Munich (DE); Bertram Gunzelmann, Koenigsbrunn (DE); Axel Huebner, Munich (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/757,444

(22) PCT Filed: Aug. 1, 2016

(86) PCT No.: PCT/EP2016/068299
§ 371 (c)(1),
(2) Date: Mar. 5, 2018

(87) PCT Pub. No.: WO2017/045829
PCT Pub. Date: Mar. 23, 2017

(65) Prior Publication Data
US 2018/0270024 A1   Sep. 20, 2018

(30) Foreign Application Priority Data
Sep. 17, 2015 (DE) .......................... 10 2015 115 681

(51) Int. Cl.
*H04L 5/00* (2006.01)
*H04L 1/18* (2006.01)
(Continued)

(52) U.S. Cl.
CPC .......... *H04L 5/0062* (2013.01); *H04L 1/1887* (2013.01); *H04L 1/201* (2013.01);
(Continued)

(58) Field of Classification Search
CPC . H04W 24/02; H04W 72/0446; H04W 72/08; H04W 72/082; H04W 72/085;
(Continued)

(56) References Cited

U.S. PATENT DOCUMENTS

2012/0236736 A1* 9/2012 Frank .................... H04W 24/04
370/252
2018/0092120 A1* 3/2018 Liu ................... H04W 72/1289

OTHER PUBLICATIONS

Qualcomm Incorporated, "eICIC CSI Restriction Signaling and Simulations", 3GPP TSG-RAN WG4 #57, 6 pgs., Nov. 10, 2010.
(Continued)

*Primary Examiner* — Kevin C. Harper
(74) *Attorney, Agent, or Firm* — Schiff Hardin LLP (57) ABSTRACT

A scheduling device for scheduling an allocation of a set of link resources includes: a prediction circuit configured to generate a predicted link quality for a first link resource of the set of link resources; a classification circuit configured to classify the first link resource to a classification pattern based on the predicted link quality of the first link resource; and an allocation circuit configured to allocate the first link resource to a first transmission or retransmission subframe set based on the classification pattern.

16 Claims, 8 Drawing Sheets

(51) Int. Cl.
　　*H04L 1/20*　　　(2006.01)
　　*H04W 72/04*　　(2009.01)
　　*H04W 72/08*　　(2009.01)
　　*H04W 24/02*　　(2009.01)

(52) U.S. Cl.
　　CPC ....... *H04W 24/02* (2013.01); *H04W 72/0446*
　　　　　　　(2013.01); *H04W 72/082* (2013.01)

(58) Field of Classification Search
　　CPC ....... H04L 5/0062; H04L 1/18; H04L 1/1887;
　　　　　　　　　　　　　　　　　　　　　　H04L 1/201
　　See application file for complete search history.

(56) References Cited

OTHER PUBLICATIONS

LG Electronics, "Necessary Signaling for Non-Zero Transmit Power ABS", 3GPP TSG RAN WG1 Meeting #70, 4 pgs., Aug. 2012.
Qualcomm Incorporated, "Details of Restricted CSI Measurements", 3GPP TSG-RAN WG1 #63, 4 pgs., Nov. 2010.
TSG RAN WG-4, "[Draft] LS Reply on CSI Measurements on Restricted Subframes for eICIC", 2 pgs., Jan. 2011.
European Patent Office, PCT International Search Report issued for PCT/EP2016/068299, 3 pgs., dated Oct. 11, 2016.

\* cited by examiner

Fig. 1 (state of art)

DEVICE AND METHOD FOR SCHEDULING AN ALLOCATION OF A SET OF LINK RESOURCES

FIELD

The disclosure relates to a device and a method for scheduling an allocation of a set of link resources, in particular related to scheduling an allocation of a set of radio resources in HARQ (Hybrid Automatic Retransmission Request) scheduling and, more particularly, to eICIC (enhanced Inter-Cell Interference Coordination) aware HARQ (Hybrid Automatic Retransmission Request) scheduling. Specifically, the disclosure describes a framework for scheduling optimizations of retransmissions in scenarios of fluctuating link quality. The disclosure further relates to a receiver, in particular a radio receiver.

BACKGROUND

Communication systems may employ data transmission schemes where a sender, on being notified by the receiver of a decoding failure of a transmitted block, schedules a retransmission of the same block of information bits—with identical or modified coding. The receiver retries decoding of the block, improving the chance for successful decoding by combining the previously received data with the retransmitted data.

This combining in the decoder usually involves input in the form of soft decision metric representations of the received bits. Optimum decoding performance requires optimum scaling of these soft decision metrics.

While ideal signal processing preceding a decoder would achieve ideal scaling under all circumstances, it is known that real receiver implementations may suffer to some degree from non-uniform scaling between received soft metrics. In the context of HARQ, such a scaling can be different, e.g. between soft-metrics related to the original transmission of a data block versus those related to a retransmission of the same data bits. The likelihood of scaling differences increases with increasing differences in the processing of the two transmissions in the receiver. A different processing may be performed, for example, for substantially different interference conditions between the two transmissions, where additional processing steps may be activated in order to mitigate an extra interference.

Figure 1:
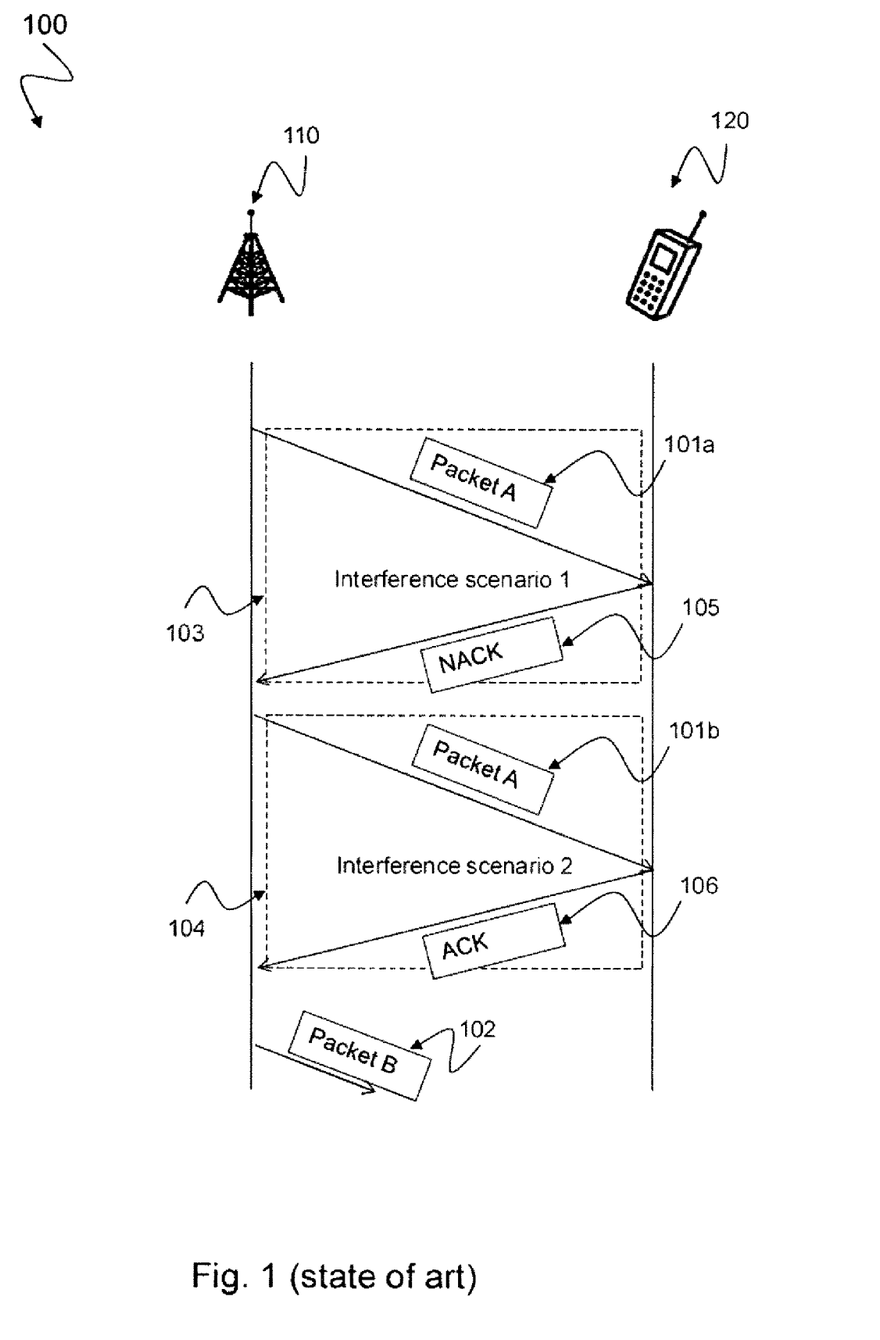
FIG. 1 is a schematic diagram illustrating a conventional retransmission scenario 100 in a mobile communication system.

Such a scenario 100 is illustrated in FIG. 1 where a first packet 101a is transmitted from a base station 110 to a mobile station 120 and caused by a non-acknowledgement NACK 105 a retransmission 101b of the first packet 101a is initiated. The original transmission is performed during a first interference scenario 103 while the retransmission is performed during a second interference scenario 104. When the base station 110 receives an acknowledgement ACK 106 a second packet 102 is transmitted.

There is a need to increase the decoding performance of a radio receiver in scenarios of data retransmissions.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense, and the scope of the present invention is defined by the appended claims.

The following terms, abbreviations and notations will be used herein:
3GPP: 3rd Generation Partnership Project,
LTE: Long Term Evolution,
LTE-A: LTE Advanced, Release 10 and higher versions of 3GPP LTE,
RF: Radio Frequency,
UE: User Equipment,
SINR: Signal-to-interference and noise ratio,
OFDM: Orthogonal Frequency Division Multiplex,
eNodeB, eNB: Base station,
IRC: Interference Rejection Combining,
(e)ICIC: (enhanced) Inter-Cell Interference Coordination,
MIMO: Multiple Input Multiple Output,
CE: Channel Estimation,
CQI: Channel Quality Index,
HARQ: Hybrid Automatic Retransmission Request or Hybrid Automatic Repeat Request,
SF: subframe,
ABS: Almost Blank Subframe.

The methods and devices described herein may be based on resource blocks, in particular resource blocks received from radio cells, and clusters. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be implemented in communication networks in which retransmissions of data are used when decoding fails or is to be improved and in which link resources can be variably allocated to data transmissions and/or data retransmissions. Basically, the communication networks considered herein may be wired networks or wireless networks. For ease of explanation, wireless communication networks, in particular communication networks based on mobile communication standards such as LTE, in particular LTE-A and/or OFDM, are considered herein. It is to be understood that features explained in the following in the context of wireless networks analogously or identically apply to wired networks. The methods and devices described below may further be implemented in a base station (NodeB, eNodeB) or a mobile device (or mobile station or User Equipment (UE)). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to 300 GHz. The frequency range may correspond to frequencies of alternating current electrical signals used to produce and detect radio waves.

The methods and devices described herein after may be designed in accordance to mobile communication standards such as e.g. the Long Term Evolution (LTE) standard or the advanced version LTE-A thereof. LTE (Long Term Evolution), marketed as 4G LTE, is a standard for wireless communication of high-speed data for mobile phones and data terminals.

The methods and devices described hereinafter may be applied in OFDM systems. OFDM is a scheme for encoding digital data on multiple carrier frequencies. A large number of closely spaced orthogonal sub-carrier signals may be used to carry data. Due to the orthogonality of the sub-carriers crosstalk between sub-carriers may be suppressed.

The methods and devices described hereinafter may be applied in multi-layer heterogeneous networks. Multi-layer heterogeneous networks (HetNet) may be used in LTE and LTE-Advanced standards to build up the network of not only a single type of eNodeB (homogeneous network), but to deploy eNodeBs with different capabilities, most importantly different Tx-power classes. These eNodeBs may commonly be referred to as macro eNodeBs or macro cells, pico eNodeBs or pico cells and femto/home eNodeBs or femto cells. Alternatively, the term "small cells" might be used as a broader term covering pico and femto cells.

The methods and devices described hereinafter may be applied in eICIC systems. ICIC based on Carrier Aggregation may enable an LTE-A UE to connect to several carriers simultaneously. It not only may allow resource allocation across carriers, it also may allow scheduler based fast switching between carriers without time consuming handover.

The methods and devices described hereinafter may be applied in interference aware receivers such as IRC (Interference Rejection Combining) receivers. IRC is a technique that may be used in an antenna diversity system to suppress co-channel interference by using the cross covariance between the noise in diversity channels. Interference rejection combining (IRC) may be used as an efficient alternative to increase uplink bit rates in areas where cells overlap. The interference rejection combining (IRC) receiver may be effective in improving the cell-edge user throughput because it may suppress inter-cell interference. The IRC receiver may be based on a minimum mean square error (MMSE) criterion, which may require channel estimation and covariance matrix estimation including the inter-cell interference with high accuracy.

The methods and devices described hereinafter may be applied in MIMO systems. Multiple-input multiple-output (MIMO) wireless communication systems employ multiple antennas at the transmitter and at the receiver to increase system capacity and to achieve better quality of service. In spatial multiplexing mode, MIMO systems may reach higher peak data rates without increasing the bandwidth of the system by transmitting multiple data streams in parallel in the same frequency band.

The methods and devices described hereinafter may be applied in systems using retransmission schemes, in particular HARQ retransmission schemes. In retransmission schemes redundant bits are added to data to be transmitted using an error-detecting code such as for example a cyclic redundancy check (CRC). A receiver detecting a corrupted message requests a new message from the sender. Hybrid automatic repeat request (hybrid ARQ or HARQ) is a combination of high-rate forward error-correcting coding and ARQ error-control. In Hybrid ARQ, the original data is encoded with a forward error correction code, and parity bits are either immediately sent along with the message or only transmitted upon request when a receiver detects an erroneous message. In Hybrid ARQ with soft combining incorrectly received coded data blocks may be stored at the receiver rather than discarded, and when the re-transmitted block is received, the two blocks are combined. By combining the previously received data with the retransmitted data, the chance for successful decoding is improved. According to the disclosure herein, decoding may be particularly improved if, e.g., all input metrics used for a decoding attempt of one data block may feature the same scaling reference, i.e. if all soft metric values (soft decision) relate to the same link quality seen by the receiver throughout all input metrics of the initial transmission and the re-transmissions. Further, as mentioned above, all this may equally apply to wired communication systems.

Figure 2:
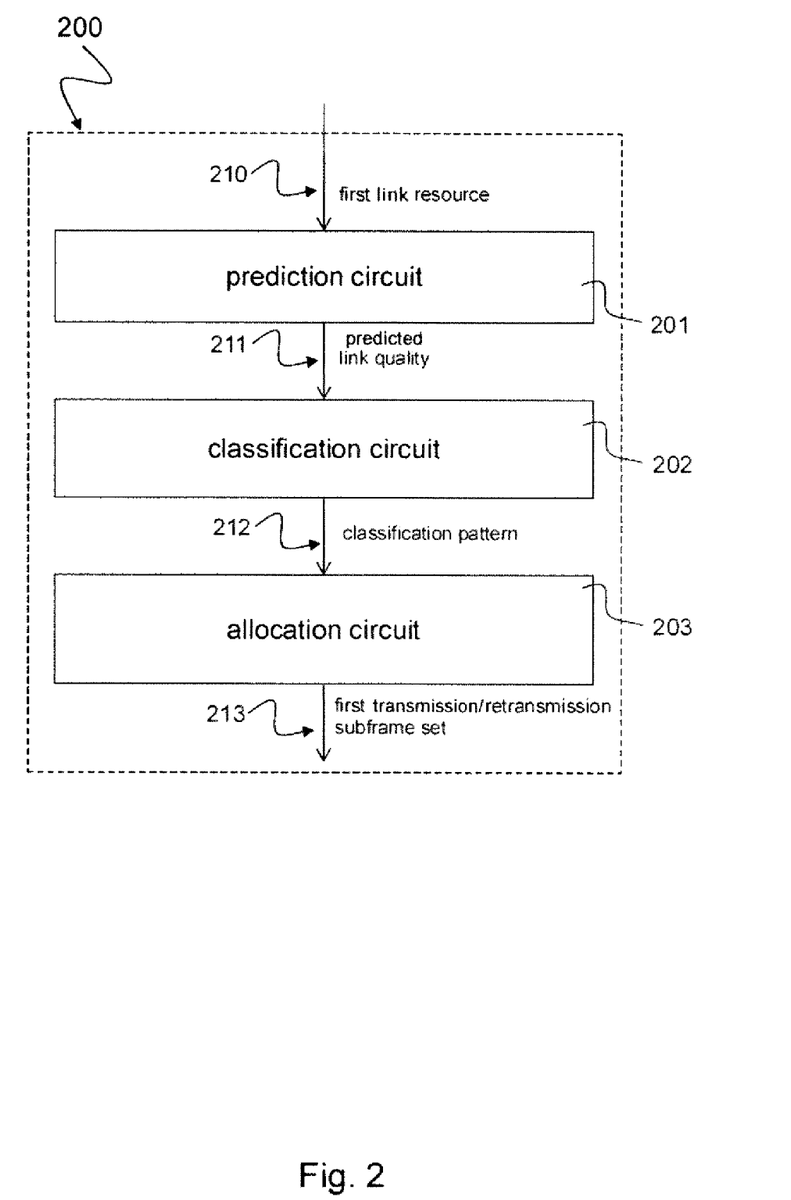
FIG. 2 schematically illustrates a scheduling device 200 for scheduling an allocation of a set of link resources in accordance with the disclosure.

FIG. 2 schematically illustrates a scheduling device 200 for scheduling an allocation of a set of link resources (e.g. radio resources) in accordance with the disclosure. The scheduling device 200 comprises a prediction circuit 201, a classification circuit 202 and an allocation circuit 203.

The prediction circuit 201 generates a predicted link quality 211 for a first link resource 210 of the (overall) set of link resources. The classification circuit 202 classifies the first link resource 210 to a classification pattern 212 based on the predicted link quality 211 of the first link resource 210. The allocation circuit 203 allocates the first link resource 210 to a first transmission or retransmission subframe set 213 based on the classification (which depends on the predicted link quality). That is, link resources (such as, e.g., different subframes) are allocated to a specific transmission or retransmission process (e.g. HARQ process) such that the initial transmission and the retransmissions relating to the same transmission or retransmission process (e.g. HARQ process) are scheduled on link resources of similar expected (i.e. predicted) link quality.

The allocation circuit 203 may be configured to allocate a (specific) link resource to a specific first transmission or retransmission process if, according to the predicted link quality of the (specific) link resource, the (specific) link resource is classified to a classification pattern of link resources having (similar) predicted link qualities which are near to a first reference value associated with the specific first transmission or retransmission process. The first reference value which may depend on an interference and noise level associated with the specific first transmission or retransmission process.

The allocation circuit 203 may allocate the first link resource 210 to a second transmission or retransmission subframe set (used for a second transmission or retransmission process) if a distance of the classification pattern 212 to a second reference value associated with the second transmission or retransmission subframe set (i.e. the second transmission or retransmission process) is below a second threshold. The distance may be expressed by a metric representing a distance of the classification pattern, e.g. specific samples of the classification pattern, to the reference value.

The first transmission or retransmission subframe set 213 may be associated with a first interference scenario and the second transmission or retransmission subframe set may be associated with a second interference scenario.

For example, the first transmission or retransmission subframe set 213 may be coordinated (co-scheduled) with a plurality of ABS subframes, and the second transmission or retransmission subframe set may be coordinated (co-scheduled) with a plurality of non-ABS subframes. In this case, the interference and noise level of the first transmission or retransmission subframe set 213 will be considerably lower (because of the many ABS subframes) than the interference and noise level of the second transmission or retransmission subframe set (because of the many non-ABS subframes).

The scheduling device 200 may further include a HARQ processing circuit that may provide the first transmission or retransmission subframe set 213 based on a first HARQ process and to provide the second transmission or retransmission subframe set based on a second HARQ process.

The set of link resources may include radio resources, and in particular a plurality of radio transmission resources in time and frequency.

The scheduling device 200 may further include a channel quality indicator circuit that may receive a Channel Quality Indicator feedback signal. The prediction circuit 201 may generate the predicted link quality 211 for the first link (e.g. radio link) resource 210 based on the received Channel Quality Indicator feedback signal.

The scheduling device 200 may further include a network information circuit that may receive network information including at least one of the following: a type of service, a modulation coding scheme, a time-frequency grid. The classification circuit 202 may classify the first link (e.g. radio link) resource based on the received network information.

The scheduling device 200 may further include a retransmission status circuit that may receive a retransmission status including at least one of the following: information on downlink CRC errors, information on downlink block errors, information on downlink NACKs, information on HARQ retransmission enabling. The allocation circuit 203 may allocate the first link (e.g. radio link) resource based on the retransmission status.

The scheduling device 200 may further include an adjusting circuit that may adjust at least one of the first threshold and the first reference value associated with the first transmission or retransmission subframe set 213.

Figure 3:
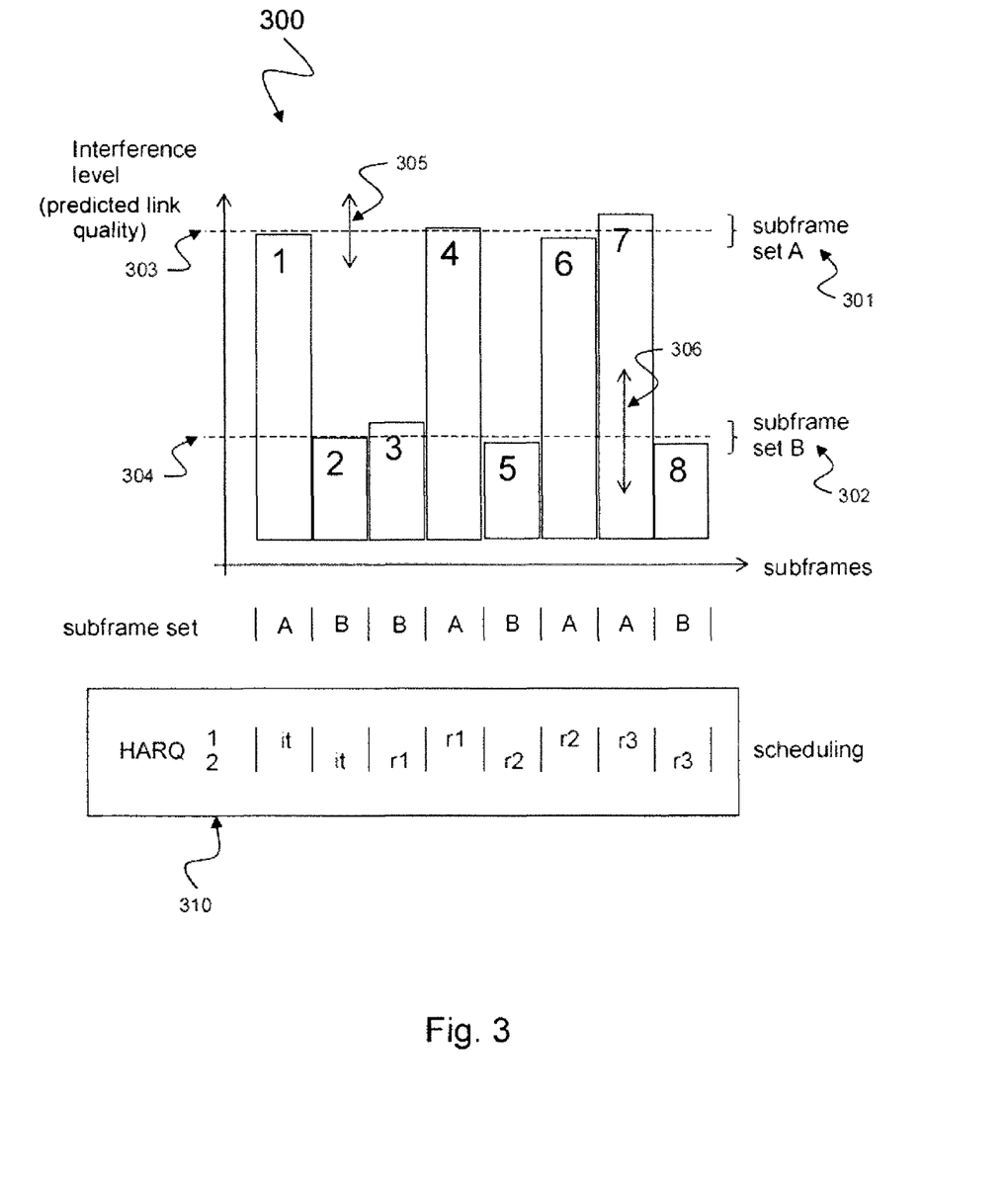
FIG. 3 schematically illustrates an exemplary subframe scheduling scenario 300 related to eICIC aware HARQ processing in accordance with the disclosure.

FIG. 3 schematically illustrates an exemplary subframe scheduling scenario 300 related to eICIC aware HARQ processing in accordance with the disclosure. In this exemplary subframe scheduling scenario 300 two subframe sets A 301 and B 302 are scheduled by a scheduling device, e.g. a scheduling device 200 as described above with respect to FIG. 2. The first subframe set A 301 may be arranged around a first reference value 303, e.g. a first reference interference level. The second subframe set B 302 may be arranged around a second reference value 304, e.g. a second reference interference level. The first subframe set 301 includes a first subframe 1, a fourth subframe 4, a sixth subframe 6 and a seventh subframe 7. The second subframe set 302 includes a second subframe 2, a third subframe 3, a fifth subframe 5 and an eighth subframe 8.

As described above with respect to FIG. 2, the prediction circuit 201 may generate a predicted link quality 211 for a first link resource 210 of the set of link resources. The classification circuit 202 may classify the first link resource 210 to a classification pattern 212 based on the predicted link quality 211 of the first link resource 210. The allocation circuit 203 may allocate the first link resource 210 to a first transmission or retransmission subframe set 301 based on the classification pattern 212. By way of example, if a distance, e.g. a metric, of the classification pattern 212 to a reference value, e.g. the first interference level 303, associated with the first transmission or retransmission subframe set 301 is below a first threshold, e.g. a first threshold 305 as illustrated in FIG. 3.

The allocation circuit 203 may allocate the first link resource 210 to a second transmission or retransmission subframe set 302 based on the classification pattern 212. By way of example, if a distance, e.g. a metric, of the classification pattern 212 to a second reference value, e.g. the second interference level 304, associated with the second transmission or retransmission subframe set 302 is below a second threshold, e.g. a second threshold 306 as illustrated in FIG. 3. First threshold 305 and second threshold 306 may be different or may have the same value. The first threshold 305 and the second threshold 306 are indicative of how similar the predicted link qualities of available link resources need to be in order to be allocated to the same transmission or retransmission process (i.e. to the same transmission or retransmission subframe set). It is to be noted that if there are only two transmission or retransmission subframe sets, a single threshold could be used for allocation. Further, it may be possible that a non-threshold based scheme is used for allocation.

The box below the subframe scheduling scenario 300 shows an exemplary scheduling 310 of the subframe sets A 301 and B 302 to two transmission or retransmission processes, in this examples two HARQ processes HARQ1 and HARQ2. From left to right, the following scheduling is performed: A first initial transmission frame "it" of the first subframe set A 301 corresponding to subframe 1 is assigned to the first HARQ process HARQ1; a first initial transmission frame "it" of the second subframe set B 302 corresponding to subframe 2 is assigned to the second HARQ process HARQ2; a first retransmission frame "r1" of the second subframe set B 302 corresponding to subframe 3 is assigned to the second HARQ process HARQ2; a first retransmission frame "r1" of the first subframe set A 301 corresponding to subframe 4 is assigned to the first HARQ process HARQ1; a second retransmission frame "r2" of the second subframe set B 302 corresponding to subframe 5 is assigned to the second HARQ process HARQ2; a second retransmission frame "r2" of the first subframe set A 301 corresponding to subframe 6 is assigned to the first HARQ process HARQ1; a third retransmission frame "r3" of the first subframe set A 301 corresponding to subframe 7 is assigned to the first HARQ process HARQ1; and a third retransmission frame "r3" of the second subframe set B 302 corresponding to subframe 8 is assigned to the second HARQ process HARQ1. It is to be noted that such assignment of link resources to different HARQ processes may be different from conventional assignment schemes using alternately serving.

The risk of differences in soft metric scaling between HARQ (re-)transmissions at the receiver can be reduced by employing a scheduling mechanism that preferably places the initial transmission and the retransmissions of a specific HARQ process on link resources of comparable signal conditions as experienced by the receiver.

Scheduling decisions on the transmitter side will in general allocate resources prioritizing those with highest expected link quality seen by the receiver. Such prioritization based allocation is meaningless if all available resources are intended to be used. In this case, throughput can be optimized by allocating transmissions related to the same HARQ process on link resources of comparable signal conditions as experienced by the receiver as illustrated in FIG. 3.

A scheduling device 200 as described above with respect to FIGS. 2 and 3 may thus overcome the performance impact of imperfect soft metric scaling for scheduling of HARQ (re-)transmissions by the following features: Predicting link quality for the set of resources available for allocation if the required allocation amount of link resources prevents prioritization of resources with high link quality; and, if HARQ retransmissions are pending, allocating resources such that transmissions related to the same HARQ processes are scheduled on resources of similar expected (i.e. predicted) link quality. This results in improved throughput for a single link and overall capacity for the transmitting entity, in particular in scenarios of at least one of the following: high load, with HARQ retransmissions occurring, where prediction of link quality differences between different resources is possible, and where different link quality is expected for different resources.

An example for such a scenario is a fully loaded LTE cell in eICIC conditions with all resources in time and frequency allocated to the same UE, with ABS subframes scheduled in known configuration, with 8 (or another number of) HARQ processes configured with link quality such that retransmissions occur.

In this case, the eNB may divide the HARQ processes in two categories where for one set of HARQ processes transmissions and retransmissions may be exclusively scheduled on subframes coinciding with ABS subframes of an interfering cell while for the other set of HARQ processes transmissions and retransmissions may be exclusively scheduled on subframes coinciding with only non-ABS subframes.

A scheduling device 200 as described above with respect to FIGS. 2 and 3 may be applied to a lot of types of data transmission schemes employing transmission or retransmission processes (e.g. HARQ), for example wired connectivity transmissions or wireless connectivity transmissions such as, e.g., LTE based transmissions where the sender may be an eNB with scheduling authority and the receiver may be a UE. Further, the scheduling device 200 may be placed in an eICIC context, where two subframe (SF) sets may be defined. Link quality as experienced by the UE may be significantly different between these two SF sets A and B while within each SF set the link quality may be fluctuating only to a low degree.

In FIG. 3, SFs in set B 302 may e.g. be considered experiencing very low interference as falling onto eICIC almost blank subframes (ABS) (i.e. the SFs in set B 302 are coordinated to ABS of an interfering cell) while SFs in set A 301 may be consistently experiencing a significantly higher amount of interference as falling onto eICIC non-ABS (i.e. the SFs in set A 301 are coordinated to non-ABS of an interfering cell). However, occurrence of ABS or non-ABS in one or more interfering cells may only be one of many possible reasons why differences in the expected/predicted link quality between SFs of the considered cell (target cell) may occur.

Figure 4:
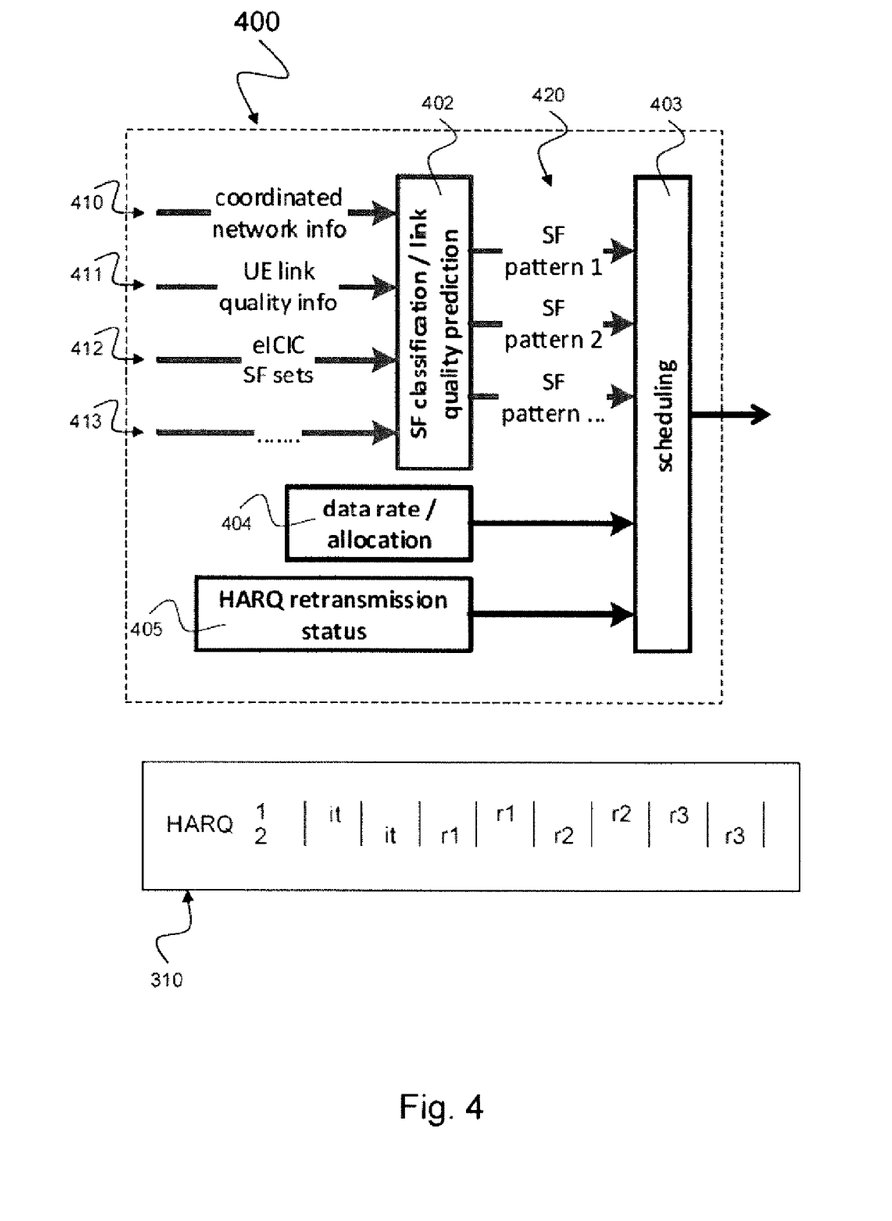
FIG. 4 schematically illustrates a scheduling device 400 usable in a base station for scheduling an allocation of a set of radio resources in accordance with the disclosure.

FIG. 4 schematically illustrates a scheduling device 400 usable in a base station for scheduling an allocation of a set of link resources in accordance with the disclosure. The scheduling device 400 includes, e.g., a subframe classification and link quality prediction circuit 402, a scheduling circuit 403, a data rate and allocation circuit 404 and a HARQ retransmission status circuit 405.

The scheduling device 400 is an example of the scheduling device 200 described above with respect to FIGS. 2 and 3. The subframe classification and link quality prediction circuit 402 may correspond to a combined prediction circuit 201 and classification circuit 202 as described above with respect to FIG. 2. The scheduling circuit 403 may correspond to the allocation circuit 203 as described above with respect to FIG. 2.

The subframe classification and link quality prediction circuit 402 may receive coordinated network information 410, e.g. information from the network about a classification mode or a prediction mode. The subframe classification and link quality prediction circuit 402 may further receive UE link quality information 411, e.g. feedback information from the UE, such as CQI (channel quality index) etc. The subframe classification and link quality prediction circuit 402 may receive information about eICIC subframe sets 412, e.g. ABS subframe sets (respectively non-ABS subframe sets) for the UE (or, more generally, subframe sets for which the target UE is considered to experience low interference (respectively high interference)). The subframe classification and link quality prediction circuit 402 may receive further information 413, e.g. about downlink allocation of subframes.

Based on these information 410, 411, 412, 413 and potentially additional information the subframe classification and link quality prediction circuit 402 may predict the link quality of SFs and may produce a plurality of subframe transmission or retransmission patterns 420 depending on the predicted link quality, e.g. a first SF pattern 1, a second SF pattern 2 and further SF patterns, for example according to the description above with respect to FIGS. 2 and 3.

The data rate allocation circuit 404 may for example determine a type of service, information on which MCS (modulation coding sets) are used, channel quality index (CQI) for selecting a MCS, information on allocation of subframes related to other UEs, information on the used time-frequency grid, etc.

The HARQ retransmission status circuit 405 may determine if a retransmission for a HARQ process, e.g. HARQ1 and HARQ2 as depicted in the exemplary scheduling diagram 310 of the subframe sets A 301 and B 302, is necessary or not, e.g. by evaluating information from CRC, ACK/NACK, block errors, enabling of HARQ retransmission, etc. For example, if in downlink (DL) transmission enabling of HARQ processing is configured and block errors are occurring, HARQ processing may be applied.

The subframe classification and link quality prediction circuit 402 may include results from the data rate allocation circuit 404 and the HARQ retransmission status circuit 405 for producing the plurality of subframe transmission or retransmission patterns 420.

An eNB that is not scheduled by using a scheduling device 400, 200 as illustrated in FIGS. 4 and 2 will ignore the impact of substantially different link quality between SF sets A and B for the mapping of HARQ retransmissions to upcoming SFs. This leads to HARQ processes with contributing transmissions consisting of both SF sets A and B, thereby potentially spoiling the combining performance at the receiver. An eNB that is scheduled by using a scheduling device 400, 200 as illustrated in FIGS. 4 and 2 will optimize the mapping with respect to the expected link quality in upcoming SFs known, e.g., by knowledge of the eICIC SF set patterns. This may lead to HARQ processes each having SFs only from one particular SF set (e.g. SF set A, SF set B, ...), i.e. all SFs allocated to a particular HARQ process and being combined in the receiver (e.g. UE) have been subject to similar receive processing steps in the UE, thus reducing the risk of inconsistent scaling between them.

Figure 5:
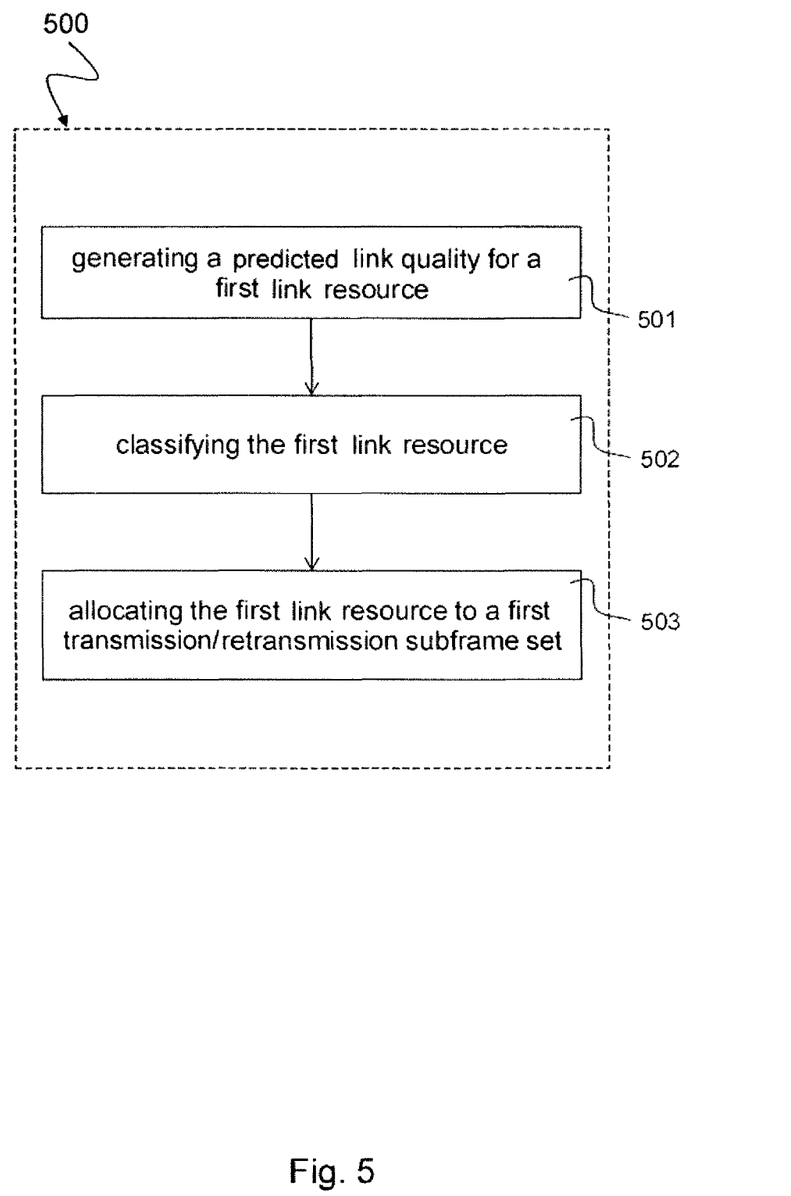
FIG. 5 schematically illustrates a method 500 for scheduling an allocation of a set of link resources in accordance with the disclosure.

FIG. 5 schematically illustrates a method 500 for scheduling an allocation of a set of radio resources in accordance with the disclosure.

The method 500 includes generating 501 a predicted link quality for a first link resource of the set of link resources, e.g. according to the prediction circuit 201 described above with respect to FIG. 2.

The method 500 includes classifying 502 the first link resource to a classification pattern based on the predicted link quality of the first link resource, e.g. according to the classification circuit 202 described above with respect to FIG. 2.

The method 500 includes allocating 503 the first link resource to a first transmission or retransmission subframe set based on the classification pattern. By way of example, the first link resource may be allocated to a first transmission or retransmission subframe set if a distance of the classification pattern to a first reference value associated with the first transmission or retransmission subframe set is below a first threshold, e.g. according to the allocation circuit 203 described above with respect to FIG. 2.

The first reference value may depend on an interference and noise level of the first transmission or retransmission subframe set. The method 500 may include allocating the first link resource to a second transmission or retransmission subframe set if a distance of the classification pattern to a second reference value associated with the second transmission or retransmission subframe set is below a second threshold, e.g. according to the allocation circuit 203 described above with respect to FIG. 2. If there are only two transmission or retransmission subframe sets, a single threshold could be used for allocation, wherein it is checked whether a distance of the classification pattern is above or below this threshold, and allocation to one of the two transmission or retransmission subframe sets (corresponding to either a first or a second transmission or retransmission process) is decided based on the threshold decision. Further, it may be possible that a non-threshold based scheme is used for allocation.

The second reference value may depend on an interference and noise level of the second transmission or retransmission subframe set. The method 500 may include associating the first transmission or retransmission subframe set with a first HARQ process; and associating the second transmission or retransmission subframe set with a second HARQ process, e.g. as described above with respect to FIGS. 2 and 3.

The method 500 may include receiving a Channel Quality Indicator feedback signal; and generating the link quality prediction for the first link resource based on the received Channel Quality Indicator feedback signal.

Figure 6:
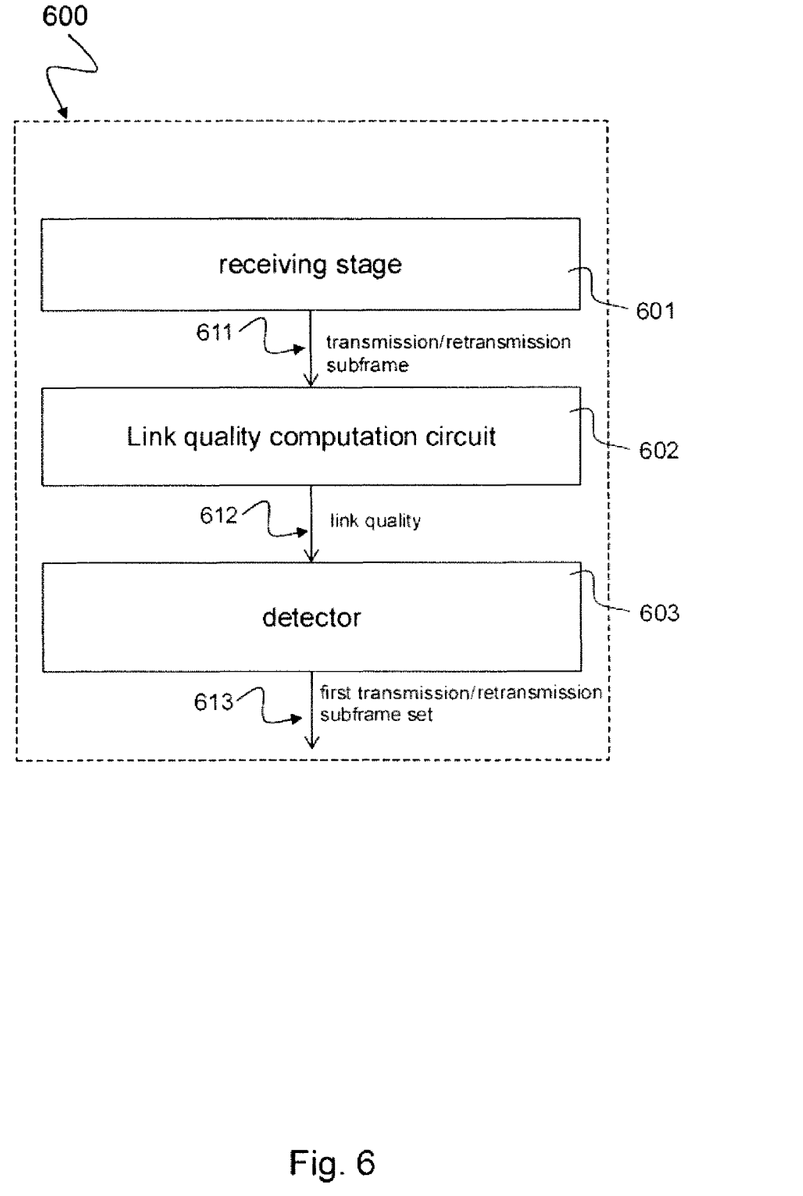
FIG. 6 schematically illustrates a receiver 600 in accordance with the disclosure.

FIG. 6 schematically illustrates a (e.g. radio) receiver 600 in accordance with the disclosure. The receiver 600 includes a receiving stage 601, a link quality computation circuit 602 and a detector 603.

The receiving stage 601 receives a transmission or retransmission subframe 611 of a plurality of Transmission or retransmission subframes (i.e. the initially transmitted subframe or one of the retransmitted subframes). The link quality computation circuit 602 computes a link quality 612 of the received transmission or retransmission subframe 611. Computation of the link quality 612 may, e.g., comprise link quality detection or may merely comprise accessing known link qualities, e.g. by reading out a lookup-table storing known link quality patterns. The detector 603 detects a first transmission or retransmission subframe of a first transmission or retransmission subframe set 613 based on the link quality of the received transmission or retransmission subframe 611. By way of example, if a difference between the link quality 612 of the received transmission or retransmission subframe 611 and a first reference value associated with the first transmission or retransmission subframe set 613 is below a first threshold. The first reference value may depend on an interference and noise level of the first transmission or retransmission subframe set 613.

The detector 603 may detect a second transmission or retransmission subframe of a second transmission or retransmission subframe set if a difference between the link quality of the received transmission or retransmission subframe and a second reference value associated with the second transmission or retransmission subframe set is below a second threshold.

The radio receiver 600 may include a first metric computation circuit for computing a first metric based on the first transmission or retransmission subframe; and a second metric computation circuit for computing a second metric based on the second transmission or retransmission subframe. The radio receiver 600 may include a decoder for decoding the first transmission or retransmission subframe by using the first metric and for decoding the second transmission or retransmission subframe by using the second metric.

The radio receiver 600 may include a noise and interference estimation circuit for computing a noise and interference of the first transmission or retransmission subframe; and a noise estimation circuit for computing a noise of the second transmission or retransmission subframe.

The first metric computation circuit may compute the first metric based on the noise and interference of the first transmission or retransmission subframe; and the second metric computation circuit may compute the second metric based on the noise and interference of the second transmission or retransmission subframe. Depending on the receive conditions (e.g. high interference/low interference), the scalings of the first and second metrics could be significantly different.

Figure 7:
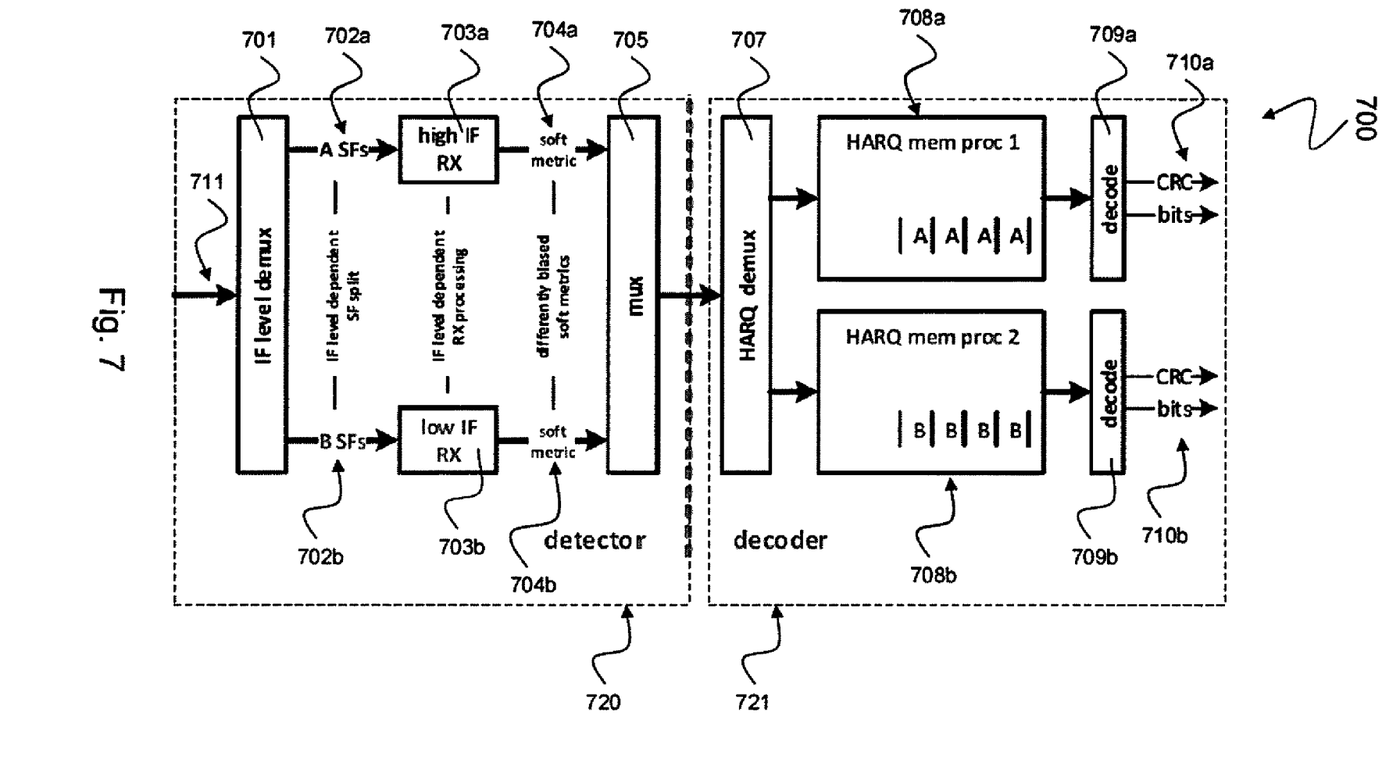
FIG. 7 schematically illustrates a radio receiver 700 including a detector 720 and a decoder 721 in accordance with the disclosure.

FIG. 7 schematically illustrates a radio receiver 700 including a detector 720 and a decoder 721 in accordance with the disclosure. The radio receiver 700 may represent an exemplary implementation of the radio receiver 600 as described above with respect to FIG. 6.

The radio receiver 700 includes a detector 720 and a decoder 721. The detector 720 may include an interference level demux circuit 701 that represents a dynamic interference level demultiplexer for demultiplexing a control input 711 based on interference level into a first subframe set A 702*a* and a second subframe set B 702*b*. That is, the interference level demux circuit 701 performs an interference level dependent subframe split into a first subframe set A 702*a* and a second subframe set B 702*b*. By way of example, high interference subframes are demultiplexed to an (upper) first path and low interference subframes are demultiplexed to a (lower) second path. Generally, the interference level demux circuit 701 may have more than two outputs each connected to a specific path associated with a specific interference level (and, e.g., lower/upper threshold thereof).

When a scheduling device 200, 400 as described above with respect to FIGS. 2 to 4 is used in the eNB, the A subframe sets 702*a* are demultiplexed to the first path and the B subframe sets 702*b* are demultiplexed to the second path. The interference level demux circuit 701 may (e.g. only) look at the interference level the incoming subframes are subjected to, but not at the content of the subframes (e.g. to which HARQ process the incoming subframes are allocated). The interference level demultiplexer circuit 701 may, e.g., comprise an interference scenario detector (not shown) detecting the interference level of incoming SFs. It is also possible that the demultiplexing of subframes to the different paths may not be based on interference scenario detection but on known patterns reflecting the various link qualities.

The detector 720 may further include in the first path (associated with the first subframe set A 702*a*) a first RX processing stage 703*a* (e.g. for high interference) and in the second path (associated with the second subframe set B 702*b*) a second RX processing stage 703*b* (e.g. for low interference). The first RX processing stage 703*a* may compute a first soft metric 704*a* based on the first subframe set A 702*a*. The second RX processing stage 703*b* may compute a second soft metric 704*b* based on the second subframe set B 702*b*. Both, the first soft metric 704*a* and the second soft metric 704*b* may be differently biased and/or scaled soft metrics. The detector 720 may further include a multiplexer 705 for multiplexing the first soft metric 704*a* and the second soft metric 704*b* and providing the multiplexed information to the decoder 721.

The decoder 721 may include a HARQ demultiplexer 707 for demultiplexing the multiplexed information from the detector 720 into a first processing path including a first HARQ memory processing circuit 708*a* and a second processing path including a second HARQ memory processing circuit 708*b*. The HARQ demultiplexer 707 looks at the content of the incoming subframes, i.e. all subframes (initial transmission, retransmissions) relating to the first HARQ process are demultiplexed to the first processing path and all subframes (initial transmission, retransmissions) relating to the second HARQ process are demultiplexed to the second processing path. According to the link quality prediction dependent allocation of the subframes to different HARQ processes in the transmitter, the demultiplexing decision of the HARQ demultiplexer 707 will (often) match the demultiplexer decision of the interference level demux circuit 701. Thus, the first HARQ memory processing circuit 708*a* may process (ideally only) subframes of the first subframe set A 702*a* while the second HARQ memory processing circuit 708*b* may process (ideally only) subframes of the second subframe set B 702*b*, e.g. according to their interference level as described above with respect to FIG. 3.

The first processing path may further include a first decoder 709*a* for decoding results of the first HARQ memory processing circuit 708*a* into CRC and bits 710*a*. The second processing path may further include a second decoder 709*b* for decoding results of the second HARQ memory processing circuit 708*b* into CRC and bits 710*b*.

The exemplary radio receiver 700 may be applied in a UE. The radio receiver 700 may apply different interference mitigation steps for SFs in set A and for SFs in set B according to their respective interference levels. This may result in equal scaling bias within a particular HARQ process and, as a result, improved HARQ combining performance in the decoder 721.

Figure 8:
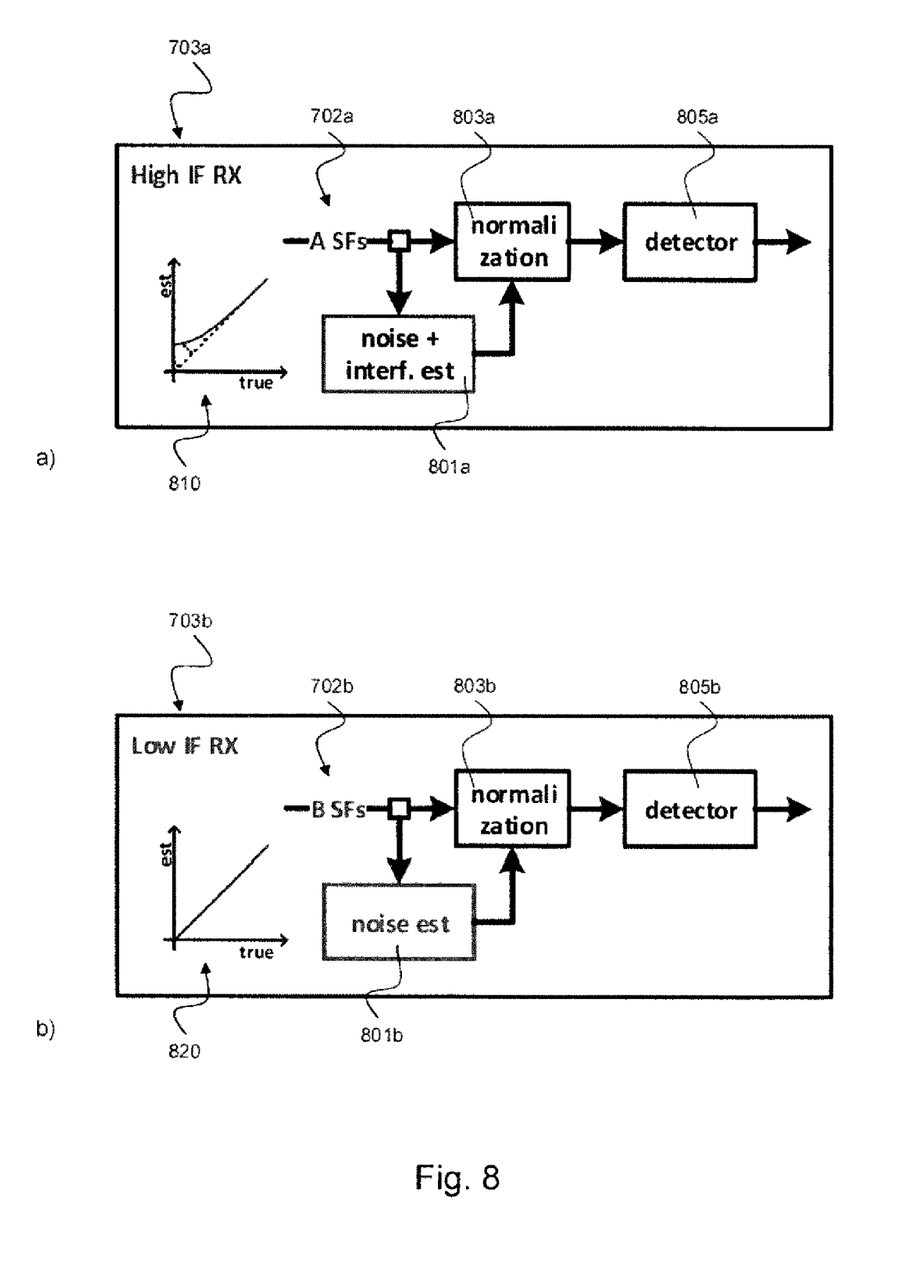
FIG. 8a schematically illustrates an exemplary first RX processing stage 703a that may be arranged in the radio receiver 700 depicted in FIG. 7 in accordance with the disclosure.
FIG. 8b schematically illustrates an exemplary second RX processing stage 703b that may be arranged in the radio receiver 700 depicted in FIG. 7 in accordance with the disclosure.

FIG. 8*a* schematically illustrates an exemplary RX processing stage 703*a* that may be arranged in the radio receiver 700 depicted in FIG. 7 in accordance with the disclosure.

The first RX processing stage 703*a* may estimate or otherwise receive information on noise and interference in an exemplary scenario of high interference 810 as depicted in the diagram in FIG. 8*a*. The first RX processing stage 703*a* may include a noise and interference estimation circuit 801*a* for estimating noise and interference based on the A subframe sets 702*a* as depicted in FIG. 7 (or may obtain noise and interference information for the A subframe sets 702*a* from other entities). The first RX processing stage 703*a* may further include a normalization circuit 803*a* for normalizing the SFs based on the estimated noise and interference and a detector 805*a* for symbol detection (e.g. a complex modulation symbol soft decision detector).

FIG. 8*b* schematically illustrates an exemplary second RX processing stage 703*b* that may be arranged in the radio receiver 700 depicted in FIG. 7 in accordance with the disclosure.

The second RX processing stage 703*b* may estimate or otherwise receive information on noise and interference in an exemplary scenario of low interference 820 as depicted in the diagram in FIG. 8*b*. The second RX processing stage 703*b* may include a noise and interference estimation circuit 801*b* for estimating noise and interference based on the B subframe sets 702*b* as depicted in FIG. 7 (or may obtain noise and interference information for the B subframe sets 702*b* from other entities). The second RX processing stage 703*b* may further include a normalization circuit 803*b* for normalizing the SFs based on the estimated noise and interference and a detector 805*b* for symbol detection (e.g. a complex modulation symbol soft decision detector). FIGS. 8*a*, 8*b* exemplarily illustrate a scenario in which the SFs in subframe set A experience noise and interference (from interfering cells) while the SFs in subframe set B only experience noise (i.e. there is no interference). Thus, the estimated noise and interference levels—and consequently the applied normalizations—are different in the first and second RX processing stages 703*a* and 703*b*.

When a scheduler 200, 400 as described above with respect to FIGS. 2 to 4 is used in an eNB, the second RX processing stage 703*b* may have information about an interference level and may apply in a low interference level scenario the less complex noise estimation circuit 801b in contrast to the noise and interference estimation circuit 801a used in a high interference scenario. For such high interference scenario, the first RX processing stage 703a is selected for processing the received subframe since it may be capable of better estimating the extra strength and/or structure of the interference the subframe is subject to. The estimate may be biased in parts of its operating range resulting in a normalization potentially different from the normalization of a different signal processing path, such as, e.g., applied to subframes processed by the second RX processing stage 703b. This may ultimately lead to soft decisions differently biased/scaled for SFs processed by the first RX processing stage 703a and SFs processed by the second RX processing stage 703b. However, the eNB scheduling of radio resources according to the disclosure allows that for one particular HARQ process, all (or at least nearly all) subframes are processed either by the first RX processing stage 703a or by the second RX processing stage 703b, but not a mixture thereof. That way, the scaling/biasing may be different for different HARQ processes but not (or very rarely) for subframes within one HARQ process. As a consequence, combining in each of the HARQ processes may be improved.

EXAMPLES

The following examples pertain to further embodiments. Example 1 is a scheduling device for scheduling an allocation of a set of link resources, the scheduling device comprising: a prediction circuit configured to generate a link quality for a first link resource of the set of link resources; a classification circuit configured to classify the first link resource to a classification pattern based on the link quality of the first link resource; and an allocation circuit configured to allocate the first link resource to a first transmission or retransmission subframe set based on the classification pattern.

In Example 2, the subject matter of Example 1 can optionally include that the allocation circuit is configured to allocate the first link resource to the transmission or retransmission subframe set if a distance of the classification pattern to a first reference value associated with the first transmission or retransmission subframe set is below a first threshold.

In Example 3, the subject matter of any one of Examples 1-2 can optionally include that the allocation circuit is configured to allocate based on the first reference value which depends on an interference and noise level of the first transmission or retransmission subframe set.

In Example 4, the subject matter of Example 2 or 3 can optionally include that the allocation circuit is configured to allocate the first link resource to a second transmission or retransmission subframe set if a distance of the classification pattern to a second reference value associated with the second transmission or retransmission subframe set is below a second threshold.

In Example 5, the subject matter of Example 4 can optionally include that the first transmission or retransmission subframe set is coordinated with a plurality of ABS subframes; and that the second transmission or retransmission subframe set is coordinated with a plurality of non-ABS subframes.

In Example 6, the subject matter of any one of Examples 4-5 can optionally include that the first transmission or retransmission subframe set is associated with a first interference scenario and the second transmission or retransmission subframe set is associated with a second interference scenario of higher interference than the first interference scenario.

In Example 7, the subject matter of any one of Examples 4-6 can optionally include that the first transmission or retransmission subframe set is associated with a first HARQ process and the second transmission or retransmission subframe set is associated with a second HARQ process.

In Example 8, the subject matter of any one of Examples 1-7 can optionally include a channel quality indicator circuit configured to receive a Channel Quality Indicator feedback signal, and can optionally include that the prediction circuit is configured to generate the link quality for the first link resource based on the received Channel Quality Indicator feedback signal.

In Example 9, the subject matter of any one of Examples 1-8 can optionally include a network information circuit configured to receive network information comprising at least one of a type of service, a modulation coding scheme, or a time-frequency grid, and can optionally include that the classification circuit is configured to classify the first link resource based on the received network information.

In Example 10, the subject matter of any one of Examples 1-9 can optionally include a retransmission status circuit configured to receive a retransmission status comprising at least one of information on downlink CRC errors, information on downlink block errors, information on downlink NACKs, or information on HARQ retransmission enabling, and can optionally include that the allocation circuit is configured to allocate the first link resource based on the retransmission status.

Example 11 is a method for scheduling an allocation of a set of link resources, the method comprising: generating a predicted link quality for a first link resource of the set of link resources; classifying the first link resource to a classification pattern based on the predicted link quality of the first link resource; and allocating the first link resource to a first transmission or retransmission subframe set based on the classification pattern.

In Example 12, the subject matter of Example 11 can optionally include that the first link resource is allocated to the first transmission or retransmission subframe if a distance of the classification pattern to a first reference value associated with the first transmission or retransmission subframe set is below a first threshold.

In Example 13, the subject matter of Example 12 can optionally include that the first reference value depends on an interference and noise level of the first transmission or retransmission subframe set.

In Example 14, the subject matter of any one of Examples 12-13 can optionally include allocating the first link resource to a second transmission or retransmission subframe set if a distance of the classification pattern to a second reference value associated with the second transmission or retransmission subframe set is below a second threshold.

In Example 15, the subject matter of Example 14 can optionally that the second reference value depends on an interference and noise level of the second transmission or retransmission subframe set.

In Example 16, the subject matter of any one of Examples 14-15 can optionally include: associating the first transmission or retransmission subframe set with a first HARQ process; and associating the second transmission or retransmission subframe set with a second HARQ process.

In Example 17, the subject matter of any one of Examples 11-16 can optionally include: receiving a Channel Quality Indicator feedback signal; and generating the predicted link quality for the first link resource based on the received Channel Quality Indicator feedback signal.

Example 18 is a radio receiver, comprising: a receiving stage configured to receive a transmission or retransmission subframe of a plurality of transmissions/retransmission subframes; a link quality computation circuit configured to compute a link quality of the received transmission or retransmission subframe; and a detector configured to detect a first transmission or retransmission subframe of a first transmission or retransmission subframe set if a difference between the link quality of the received transmission or retransmission subframe and a first reference value associated with the first transmission or retransmission subframe set is below a first threshold.

In Example 19, the subject matter of Example 18 can optionally include that the first reference value depends on an interference and noise level of the first transmission or retransmission subframe set.

In Example 20, the subject matter of any one of Examples 18-19 can optionally include that the detector is configured to detect a second transmission or retransmission subframe of a second transmission or retransmission subframe set if a difference between the link quality of the received transmission or retransmission subframe and a second reference value associated with the second transmission or retransmission subframe set is below a second threshold.

In Example 21, the subject matter of Example 20 can optionally include a first metric computation circuit configured to compute a first metric based on the first transmission or retransmission subframe; and a second metric computation circuit configured to compute a second metric based on the second transmission or retransmission subframe.

In Example 22, the subject matter of Example 21 can optionally include a decoder configured to decode the first transmission or retransmission subframe by using the first metric and to decode the second transmission or retransmission subframe by using the second metric.

In Example 23, the subject matter of any one of Examples 21-22 can optionally include a noise and interference estimation circuit configured to compute a noise and interference of the first transmission or retransmission subframe and a noise and interference of the second transmission or retransmission subframe.

In Example 24, the subject matter of Example 23 can optionally include that the first metric computation circuit is configured to compute the first metric based on the noise and interference of the first transmission or retransmission subframe; and that the second metric computation circuit is configured to compute the second metric based on the noise and interference of the second retransmission subframe, wherein the noise and interference of the first transmission or retransmission subframe and the noise and interference of the second transmission or retransmission subframe are significantly different.

Example 25 is a computer readable medium on which computer instructions are stored which, when executed by a computer, cause the computer to perform the method of one of Examples 11 to 17.

Example 26 is a scheduling system for scheduling an allocation of a set of link resources, the scheduling system comprising: a prediction subsystem configured to generate a predicted link quality for a first link resource of the set of link resources; a classification subsystem configured to classify the first link resource to a classification pattern based on the predicted link quality of the first link resource; and an allocation subsystem configured to allocate the first link resource to a first transmission or retransmission subframe set if a distance of the classification pattern to a first reference value associated with the first transmission or retransmission subframe set is below a first threshold.

In Example 27, the subject matter of Example 26 can optionally include that the allocation subsystem is configured to allocate based on the first reference value which depends on an interference and noise level of the first transmission or retransmission subframe set.

In Example 28, the subject matter of any one of Examples 26-27 can optionally include that the allocation subsystem is configured to allocate the first link resource to a second transmission or retransmission subframe set if a distance of the classification pattern to a second reference value associated with the second transmission or retransmission subframe set is below a second threshold.

In Example 29, the subject matter of Example 28 can optionally include that the first transmission or retransmission subframe set is coordinated with a plurality of ABS subframes; and that the second transmission or retransmission subframe set is coordinated with a plurality of non-ABS subframes.

In Example 30, the subject matter of any one of Examples 27-30 can optionally include that the system is an on-chip system.

Example 31 is a device for scheduling an allocation of a set of link resources, the device comprising: means for generating a predicted link quality for a first link resource of the set of link resources; means for classifying the first link resource to a classification pattern based on the link quality of the first link resource; and means for allocating the first link resource to a first transmission or retransmission subframe set based on the classification pattern.

In Example 32, the subject matter of Example 31 can optionally include that the means for allocating is configured to allocate the first link resource to the first transmission or retransmission subframe set if a distance of the classification pattern to a first reference value associated with the first transmission or retransmission subframe set is below a first threshold.

In Example 33, the subject matter of Example 32 can optionally include that the first reference value depends on an interference and noise level of the first transmission or retransmission subframe set.

In Example 34, the subject matter of any one of Examples 31-33 can optionally include means for allocating the first link resource to a second transmission or retransmission subframe set if a distance of the classification pattern to a second reference value associated with the second transmission or retransmission subframe set is below a second threshold.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A scheduling device for scheduling an allocation of a set of link resources, the scheduling device comprising:
a prediction circuit configured to generate a predicted link quality for a first link resource of the set of link resources;
a classification circuit configured to classify the first link resource to a classification pattern based on the predicted link quality of the first link resource; and
an allocation circuit configured to allocate the first link resource to a first transmission or retransmission subframe set based on the classification pattern,
wherein the allocation circuit is configured to allocate the first link resource to the first transmission or retransmission subframe set if a distance of the classification pattern to a first reference value associated with the first transmission or retransmission subframe set is below a first threshold.

2. The scheduling device of claim 1,
wherein the allocation circuit is configured to allocate based on the first reference value which depends on an interference and noise level of the first transmission or retransmission subframe set.

3. The scheduling device of claim 1,
wherein the allocation circuit is configured to allocate the first link resource to a second transmission or retransmission subframe set if a distance of the classification pattern to a second reference value associated with the second transmission or retransmission subframe set is below a second threshold.

4. The scheduling device of claim 3,
wherein the first transmission or retransmission subframe set is coordinated with a plurality of ABS subframes; and
wherein the second transmission or retransmission subframe set is coordinated with a plurality of non-ABS subframes.

5. The scheduling device of claim 3,
wherein the first transmission or retransmission subframe set is associated with a first interference scenario and the second transmission or retransmission subframe set is associated with a second interference scenario of higher interference than the first interference scenario.

6. The scheduling device of claim 3, further comprising:
a HARQ processing circuit configured to provide the first transmission or retransmission subframe set associated with a first HARQ process and to provide the second transmission or retransmission subframe set associated with a second HARQ process.

7. A scheduling device for scheduling an allocation of a set of link resources, the scheduling device comprising:
a prediction circuit configured to generate a predicted link quality for a first link resource of the set of link resources;
a classification circuit configured to classify the first link resource to a classification pattern based on the predicted link quality of the first link resource;
an allocation circuit configured to allocate the first link resource to a first transmission or retransmission subframe set based on the classification pattern; and
a channel quality indicator circuit configured to receive a Channel Quality Indicator feedback signal,
wherein the prediction circuit is configured to generate the predicted link quality for the first link resource based on the received Channel Quality Indicator feedback signal.

8. A scheduling device for scheduling an allocation of a set of link resources, the scheduling device comprising:
a prediction circuit configured to generate a predicted link quality for a first link resource of the set of ink resources;
a classification circuit configured to classify the first link resource to a classification pattern based on the predicted link quality of the first link resource;
an allocation circuit configured to allocate the first link resource to a first transmission or retransmission subframe set based on the classification pattern; and
a network information circuit configured to receive network information comprising at least one of a type of service, a modulation coding scheme, or a time-frequency grid,
wherein the classification circuit is configured to classify the first link resource based on the received network information.

9. A scheduling device for scheduling an allocation of a set of link resources, the scheduling device comprising:
a prediction circuit configured to generate a predicted link quality for a first link resource of the set of link resources;
a classification circuit configured to classify the first line resource to a classification pattern based on the predicted link quality of the first link resource;
an allocation circuit configured to allocate the first link resource to a first transmission or retransmission subframe set based on the classification pattern; and
a retransmission status circuit configured to receive a retransmission status comprising at least one of information on downlink CRC errors, information on downlink block errors, information on downlink NACKs, or information on HARQ retransmission enabling,
wherein the allocation circuit is configured to allocate the first link resource based on the retransmission status.

10. A method for scheduling an allocation of a set of link resources, the method comprising:
generating a predicted link quality for a first link resource of the set of link resources;
classifying the first link resource to a classification pattern based on the predicted link quality of the first link resource; and
allocating the first link resource to a first transmission or retransmission subframe set based on the classification pattern,
wherein the first link resource is allocated to the first transmission or retransmission subframe set if a distance of the classification pattern to a first reference value associated with the first transmission or retransmission subframe set is below a first threshold.

11. The method of claim 10,
wherein the first reference value depends on an interference and noise level of the first transmission or retransmission subframe set.

12. The method of claim 10, comprising:
allocating the first link resource to a second transmission or retransmission subframe set if a distance of the classification pattern to a second reference value associated with the second transmission or retransmission subframe set is below a second threshold.

13. The method of claim 12, wherein the second reference value depends on an interference and noise level of the second transmission or retransmission subframe set.

14. The method of claim 12, comprising:
associating the first transmission or retransmission subframe set with a first HARQ process; and
associating the second transmission or retransmission subframe set with a second HARQ process.

15. The method of claim 10, comprising:
receiving a Channel Quality Indicator feedback signal; and
generating the predicted link quality for the first link resource based on the received Channel Quality Indicator feedback signal.

16. A non-transitory computer readable medium on which computer instructions are stored which, when executed by a computer, cause the computer to perform the method of claim 10.

* * * * *